United States Patent
Shanbhag

(10) Patent No.: US 10,972,451 B2
(45) Date of Patent: Apr. 6, 2021

(54) BAND STEERING OF CLIENT DEVICES TO DUAL-BAND LEGACY ACCESS POINTS

(71) Applicant: Harman Becker Automotive Systems GmbH, Karlsbad (DE)

(72) Inventor: Sandeep Shanbhag, Bangalore (IN)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 16/463,354

(22) PCT Filed: Nov. 23, 2016

(86) PCT No.: PCT/IB2016/057066
§ 371 (c)(1),
(2) Date: May 22, 2019

(87) PCT Pub. No.: WO2018/096384
PCT Pub. Date: May 31, 2018

(65) Prior Publication Data
US 2019/0357080 A1    Nov. 21, 2019

(51) Int. Cl.
| | |
|---|---|
| H04W 28/06 | (2009.01) |
| H04W 12/06 | (2021.01) |
| H04W 8/24 | (2009.01) |
| H04L 29/06 | (2006.01) |
| H04W 76/15 | (2018.01) |
| H04W 48/16 | (2009.01) |
| H04W 80/02 | (2009.01) |
| H04W 12/08 | (2021.01) |

(52) U.S. Cl.
CPC .............. *H04L 63/08* (2013.01); *H04W 8/24* (2013.01); *H04W 12/0609* (2019.01); *H04W 12/0804* (2019.01); *H04W 12/0808* (2019.01); *H04W 28/06* (2013.01); *H04W 48/16* (2013.01); *H04W 76/15* (2018.02); *H04W 80/02* (2013.01)

(58) Field of Classification Search
CPC ................................ H04W 28/06; H04W 8/24
See application file for complete search history.

(56) References Cited

U.S. PATENT DOCUMENTS

| | | | |
|---|---|---|---|
| 2012/0243474 | A1 | 9/2012 | Iyer et al. |
| 2012/0322481 | A1 | 12/2012 | Laroche et al. |

(Continued)

OTHER PUBLICATIONS

Ahnsul Saxena, Everything You Need to Know About In-Vehicle Infotainment Systems, Aug. 17, 2018, e-Info Chips, All (Year: 2018).*

(Continued)

*Primary Examiner* — Angel T Brockman
(74) *Attorney, Agent, or Firm* — McCoy Russell LLP

(57) ABSTRACT

A band steering method for a wireless network comprising access points, for example legacy access points, is disclosed. The network comprises a first and second radio bands, the wireless access point, and one or more client devices. The method comprises receiving an open authentication request at the wireless access point from the client device on one or more of its radio bands. If the open authentication request is received on the second radio band, the method comprises generating an open authentication response, whereas if the open authentication request is received only on the first radio band, the method comprises generating a delayed open authentication response.

16 Claims, 4 Drawing Sheets

(56) References Cited

U.S. PATENT DOCUMENTS

2015/0230093 A1    8/2015   Park et al.
2018/0288614 A1*   10/2018   Zaks .................... H04L 63/083
2019/0007929 A1*   1/2019   Senderovitz .......... H04W 72/02

OTHER PUBLICATIONS

ISA European Patent Office, International Search Report and Written Opinion Issued in Application No. PCT/IB2016/057066, dated Aug. 7, 2017, WIPO, 10 pages.

* cited by examiner

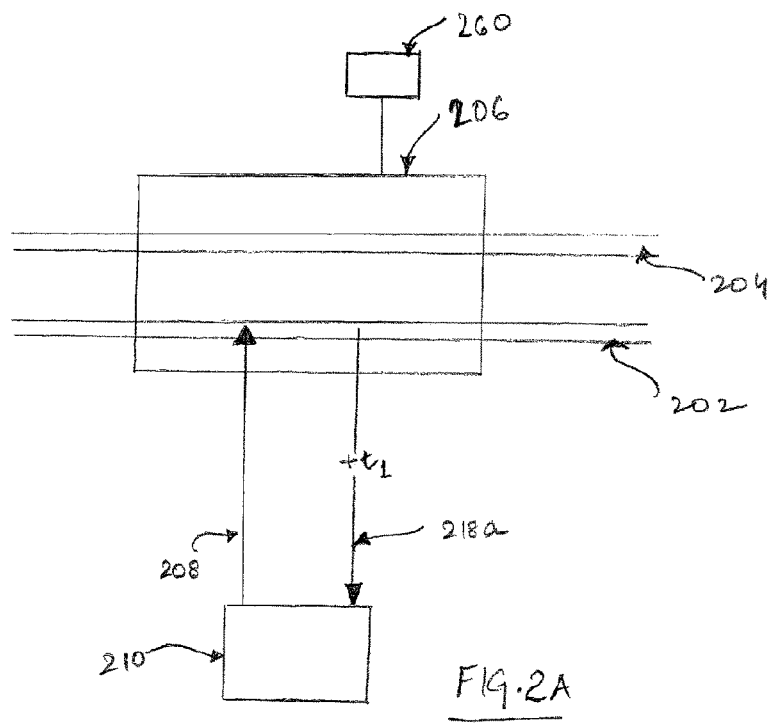
FIG. 2A
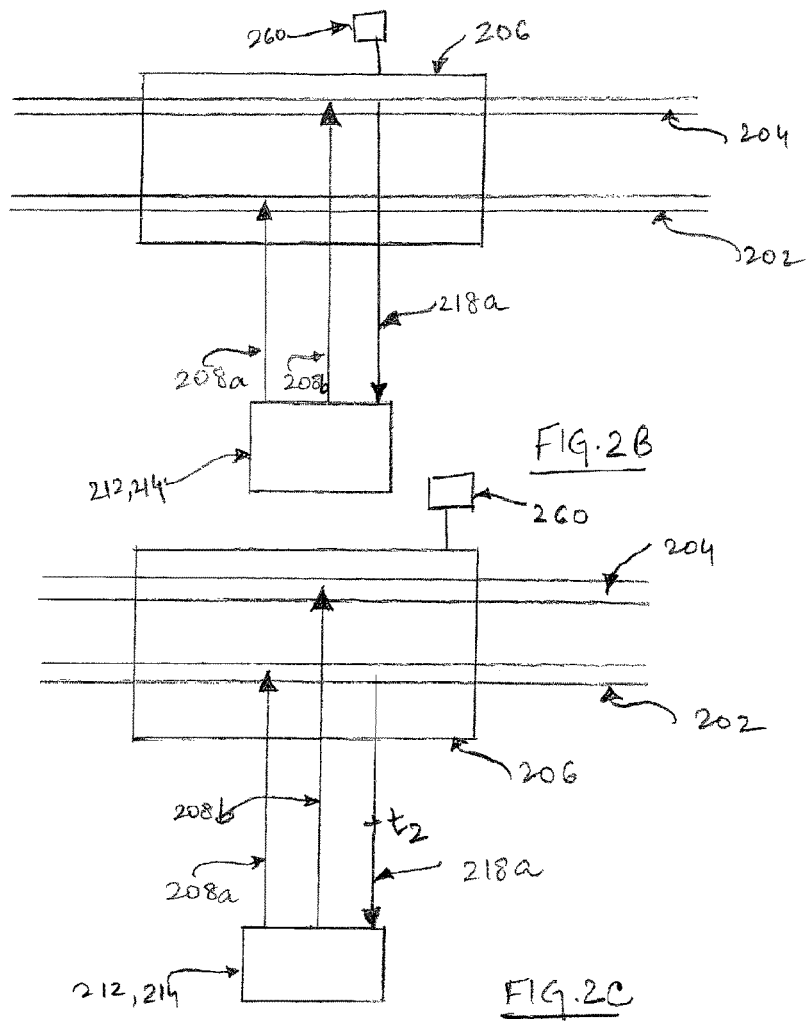
FIG. 2B
FIG. 2C

BAND STEERING OF CLIENT DEVICES TO DUAL-BAND LEGACY ACCESS POINTS

CROSS REFERENCE TO RELATED APPLICATIONS

The present application is a national phase of International Application No. PCT/IB2016/057066 entitled "BAND STEERING OF CLIENT DEVICES TO DUAL-BAND LEGACY ACCESS POINTS", and filed on Nov. 23, 2016. The entire contents of the above-identified application are hereby incorporated by reference for all purposes.

TECHNICAL FIELD

The present invention generally relates to a band steering method and a system for a wireless network. More particularly it relates to a band steering method and system for steering remote client devices to appropriate (Wi-Fi) radio bands or channels in a wireless network having legacy access points.

BACKGROUND OF THE INVENTION

In legacy Wi-Fi infrastructure networks, i.e. networks based on older 802.11x standards that predate the 802.11n standard like 802.11a, 802.11b, and 802.11g, a device is either supposed to play the role of a Wi-Fi station (STA) or a Wi-Fi Access Point (AP). An STA is a device that connects to an AP to join a Wi-Fi network. An STA can connect to an AP but an STA cannot connect to another STA or an AP cannot connect to another AP. So if there are two devices that support the station role then they cannot connect to each other but require an AP in between to communicate with each other.

With advancement in Wi-Fi chipset technology, more and more semiconductor manufacturers are able to design and fabricate real dual band Wi-Fi chipsets. There is huge demand from various product manufacturers for such dual band Wi-Fi chipsets. With this advancement most of the modern Wi-Fi products have started supporting both the Wi-Fi ISM (industrial, scientific, and medical) bands, namely 2.4 GHz and 5 GHz. As a result of this advancement the Wi-Fi products that support both the Wi-Fi ISM bands are being majorly introduced into existing networks that previously only contained single band supporting Wi-Fi devices or wireless client devices, i.e. only devices which support the 2.4 GHz radio band.

Product manufacturers would like to support all Wi-Fi roles in both the bands by the client devices so that all Wi-Fi features can be supported on both the bands. Hence, in legacy Wi-Fi networks, Wi-Fi Station (STA) role and Wi-Fi Access Point (AP) role can be supported in both the Wi-Fi ISM bands, namely 2.4 GHz and 5 GHz.

Many original equipment manufacturers, especially Automotive OEMs, are demanding support for Wi-Fi Access Point role in both the bands on an Infotainment Head-Unit system. They are also mandating that the SSID and the security for both the APs on both the bands be exactly the same so that the APs are visible as a single network to the remote devices. The main rationale behind this is that any kind of Wi-Fi feature, such as internet connectivity, Miracast etc., could be supported in both the bands.

Preferably, dual band remote devices capable of operating in both the bands must always connect to the AP running on 5 GHz band whereas single band remote devices capable of operating only in 2.4 GHz band must connect to the AP running in 2.4 GHz band. In this way the Wi-Fi features shall be available to both categories of remote devices.

A major problem with having APs in both the bands is that there is no standard way of controlling to which band AP the dual-band capable remote devices shall connect to. A remote wireless device which is dual-band capable discovers the APs on both the bands. But since both the BSS (Basic Service Set) or APs belong to the same ESS (Extended Service Set) the remote device applies its own proprietary algorithm to choose the AP on which band to connect to. Based on the selection the remote device filters and shows just that one selected network to the end user for connection in the GUI (Graphical User Interface). It does not show both the APs as the SSID of both the APs is the same.

So there is a possibility that the dual band capable remote device can connect to the AP on the 2.4 GHz band of the Automotive Head-Unit instead of connecting on the 5 GHz band. This is not at all desirable to the OEMs due to a decrease in performance and quality in terms of throughput for the end feature. It is preferable for wireless client devices to use the 5 GHz band over the 2.4 GHz band as the 5 GHz band offers lower interference and higher throughput capabilities which guarantees better quality for any end feature that works on the wireless network. Hence it is always desirable that a dual-band capable remote device must always try to connect to a 5 GHz network, as a first choice, rather than to a 2.4 GHz network.

Another issue that would arise if dual-band devices connect to 2.4 GHz is that there would be undesirable bandwidth sharing on 2.4 GHz channel of the AP and on the other hand complete wastage of bandwidth on the 5 GHz channel of the AP. On a dual band chipset the 2.4 GHz AP and 5 GHz AP have their own independent bandwidth to offer to their connected clients. But if the dual band remote devices as well as single band remote devices all connect to 2.4 GHz AP then the bandwidth of 2.4 GHz AP gets unnecessarily shared between many remote devices resulting in bad quality and user experience whereas the bandwidth of 5 GHz AP gets wasted due to no or too few connections.

These above described problems can be solved by implementing a method of band-steering. This method is capable of influencing or steering the dual band remote devices to connect to the 5 GHz AP rather than the 2.4 GHz AP, wherein 5 GHz AP means the access point that is visible to the client device on the 5 GHz radio band and 2.4 GHz AP means the access point which is visible to the client device on the 5 GHz radio band. Currently there is no standard way or method of implementing band-steering that provides an optimized yet a simple standard solution for band steering.

SUMMARY OF THE INVENTION

According to one of many embodiments, there is provided a method for steering wireless client devices to appropriate (Wi-Fi) radio bands by implementing an efficient band-steering technique.

Most Band-Steering solution in commercial devices involve first allowing the connection from the dual band remote device to the 2.4 GHz band and then later moving the connection to the 5 GHz band. This involves disconnection of existing connection with 2.4 GHz AP and reconnection with the 5 GHz AP. This results in disruption of traffic on the 2.4 GHz AP and there by hampers the user experience. The Band-Steering method according to an embodiment comprises first determination of the dual band capability of the remote device and then overriding the AP selection algorithm on the dual band remote device if it has chosen to connect to 2.4 GHz and thereby steer it to connect to 5 GHz band AP. The feature of carrying out the Band-Steering during connection process and thereby steering the connection from a dual band capable device to the 5 GHz AP does not involve any disconnection or reconnection and hence is fully transparent to the end user.

Thus a band steering method implemented on a dual band access point would ensure that a dual band capable Wi-Fi Station or client device would always (at least most of the times) connect to the 5 GHz access point and a single band capable Wi-Fi Station or client device would always connect to the 2.4 GHz access point.

Using Wi-Fi management packets like probe-requests and association requests for band steering is as such known in the art. By restricting responses to probe-requests, the remote device (Wi-Fi Station) cannot even discover that there is an AP in the particular band. Using Wi-Fi management packets like open authentication request which is exchanged even before association using the methods as claimed provides an advantageous edge over the prior art. The remote device can discover that the AP exists in two different bands (2.4 GHz and 5 GHz) and this gives it an opportunity to still decide to which AP in which band it finally wants to connect.

When a Wi-Fi STA connects to a Wi-Fi AP, the first step that occurs is the step of authentication. Next the step of association is carried out. In known band steering methods the AP allows authentication to happen even in a wrong or undesirable band and then tries to restrict the subsequent association packet exchange by refraining to respond to the association request from the Wi-Fi Station. The disadvantage arising out of this method is that the authentication packet exchange has already occurred leading to a waste of time.

As the AP does not want to encourage the STA to connect to a certain band, for example band X, of the AP, the STA tries the same connection on its band Y, for example, and according to the claimed method, the connection is restricted at the first packet exchange during the connection procedure which is the authentication packet exchange as this would save time and make band steering faster.

According to one of many embodiments a band steering method for a wireless network comprising access points, for example legacy access points, is disclosed. The network comprises a first and second radio bands, the wireless access point, and one or more client devices. The method comprises receiving an open authentication request management frame at the wireless access point from the client device on one or more of its radio bands. If the open authentication request is received on the second radio band, the method comprises generating an open authentication response management frame; whereas if the open authentication request is received only on the first radio band, then a delayed open authentication response is generated.

According to an embodiment the delayed open authentication response is generated after expiry of a predetermined first period of time $t_1$ if no open authentication request is received on the second radio band during the time $t_1$ or after expiry of a predetermined second period of time $t_2$ if the open authentication request is received on the second radio band during the time $t_1$, wherein the predetermined first period of time $t_1$ is smaller than the predetermined second period of time $t_2$. In the first situation, where there is no open authentication request received on the second radio band during the time $t_1$, it could mean that the device may be a single band capable client device and hence the access point allows the connection on the first radio band by sending the response. In the second situation, the open authentication request is received on the second radio band during the time $t_1$. This implies that the client device is a dual band capable client device. However, the response is still generated by the access point to allow connection on the first radio band but only after a further time delay. This remedies the undesirable situation when the dual band client device is, for some reason, unable to receive the response from the access point on the second radio band, and has waited for a considerable amount of time. Ideally when the dual band client device, during the time $t_1$, has sent an open authentication request on the second radio band of the access point, the access point would immediately respond with an open authentication response and let the client device connect on its second radio band. However, should a situation arise when the client device still does not receive a response from the access point on the second radio band, it should then be allowed to connect to the access point via the first radio band as this would avoid an indeterminate delay in the client device in establishing a successful connection to be able to communicate within the network. Hence, after waiting for a further period of time it is finally allowed a successful connection with the access point on the first radio band if the connection with the second radio band has not been successful during the second period of time $t_2$.

According to one of many embodiments, the method further comprises implementing an independent MAC filter logic for each of the bands on the wireless access point for allowing or restricting generation of open authentication response for the client device based on a MAC address of the client device. This provides an easy implementation technique for controlling generation of open authentication response by the access point.

According to an embodiment the MAC address of the client device is added to a blacklist of the access point for the first radio band if the client device is determined to be a dual band capable client device and the MAC address of the client device is not already on the blacklist. This also adds to the ease of implementing a control on the generation of open authentication response by the access point.

According to various embodiments, a client device is determined to be a dual band capable client device when the MAC address of the client device sending a probe response on the first radio band of the access point is same as the MAC address of the client device sending a probe response on the second radio band of the access point. This helps in easy identification of client devices which have dual band capability.

In various embodiments, the first radio band is a 2.4 GHz industrial, scientific and medical (ISM) radio band and the second radio band is a 5 GHz ISM radio band.

In various embodiments, the wireless access point is a dual band Legacy Access Point. It can support all the features of a legacy Wi-Fi network.

In various embodiments, the wireless access point is located on an Infotainment Head Unit system. The access point may be present in an automobile head unit. The head unit comprises a set of software and hardware units that together provide information as well as entertainment to the users. It can also perform automotive control functions. Automotive infotainment systems have many wireless client devices simultaneously trying to establish a connection to be able to use the available radio bands. Having a band-steering mechanism as disclosed herein implemented for an automotive infotainment system that uses a head unit, the bandwidth utilization of the system can be regulated in a favorable manner and overcrowding of any one band can be avoided.

In various embodiments, the radio bands support Wi-Fi Access Point roles or Wi-Fi Legacy roles.

According to one of many embodiments, the wireless access point maintains an internal timer for tracking the first and second periods of time, $t_1$ and $t_2$ respectively. By keeping a record of the time for which the client device is made to wait until it receives a response from the access point ensures that there is no uncertainty to the amount of time for which the client device is denied connection. It avoids situations where a dual band capable client device is unable to connect with the access point on the second radio band for some reason, and is nevertheless made to wait for an indeterminate amount of time instead of allowing connection with the first radio band.

In various embodiments, the method is implemented in a Wi-Fi chipset firmware. In various embodiments, the method is implemented by a Wi-Fi driver. The advantage of implementing the method through Wi-Fi chipset firmware or Wi-Fi driver is that it provides flexibility as to updates or changes required by different users. Wi-Fi chipsets or drivers can be updated as and when new features and updates need to be added or installed into the systems where these drivers or chipsets are used for implementing the claimed method. Thereby, the possibilities of future developments are not shut out from the system. In addition the chipset or drivers can be later integrated with different devices as desired by the user.

According to one of many embodiments, a system comprising a controller and a network is disclosed. The network comprises a first and a second radio band, a wireless access point controlled by the controller and one or more client devices. The wireless access point is arranged to receive an open authentication request from the client device on one or more of the radio bands. In other words, these radio bands act as channels on which the access point can receive authentication request management frames from the client devices. For example, a single band capable client device can send a probe request on the first radio band and once it detects an access point on the first radio band, it subsequently sends an open authentication request management frame on the first radio band in an attempt to establish a connection with the visible access point on the first radio band. Similarly, a dual band capable client device sends probe requests on both the radio bands to discover the access point on the radio bands. Once it discovers an access point on either or both of the radio bands, it tries to establish a connection by sending out an open authentication request management frame on the radio band on which it has discovered the access point, or in other words, to the visible access point's radio band.

According to the disclosed system, the access point is configured to immediately generate an open authentication response if the probe request is received on the second radio band. However, the access point is configured to generate a delayed open authentication response if the open authentication request is received only on the first radio band.

According to various embodiments, the system comprises a memory unit. The controller may save in the memory unit the result of determination as to which of the client devices are single band capable client devices and/or which are dual band capable client devices. This list can be utilized in future to save time.

In accordance with another embodiment, there is provided a computer-program product having a non-transitory computer readable medium storing computer executable code which, when executed by computer, causes the above described method to be performed.

BRIEF DESCRIPTION OF THE DRAWINGS

The present invention may be better understood from reading the following description of non-limiting embodiments, with reference to the attached drawings, wherein:

FIG. 2A, FIG. 2B and FIG. 2C schematically show various example systems in accordance with one of a number of embodiments;

DETAILED DESCRIPTION OF THE PREFERRED EMBODIMENTS

Figure 1:
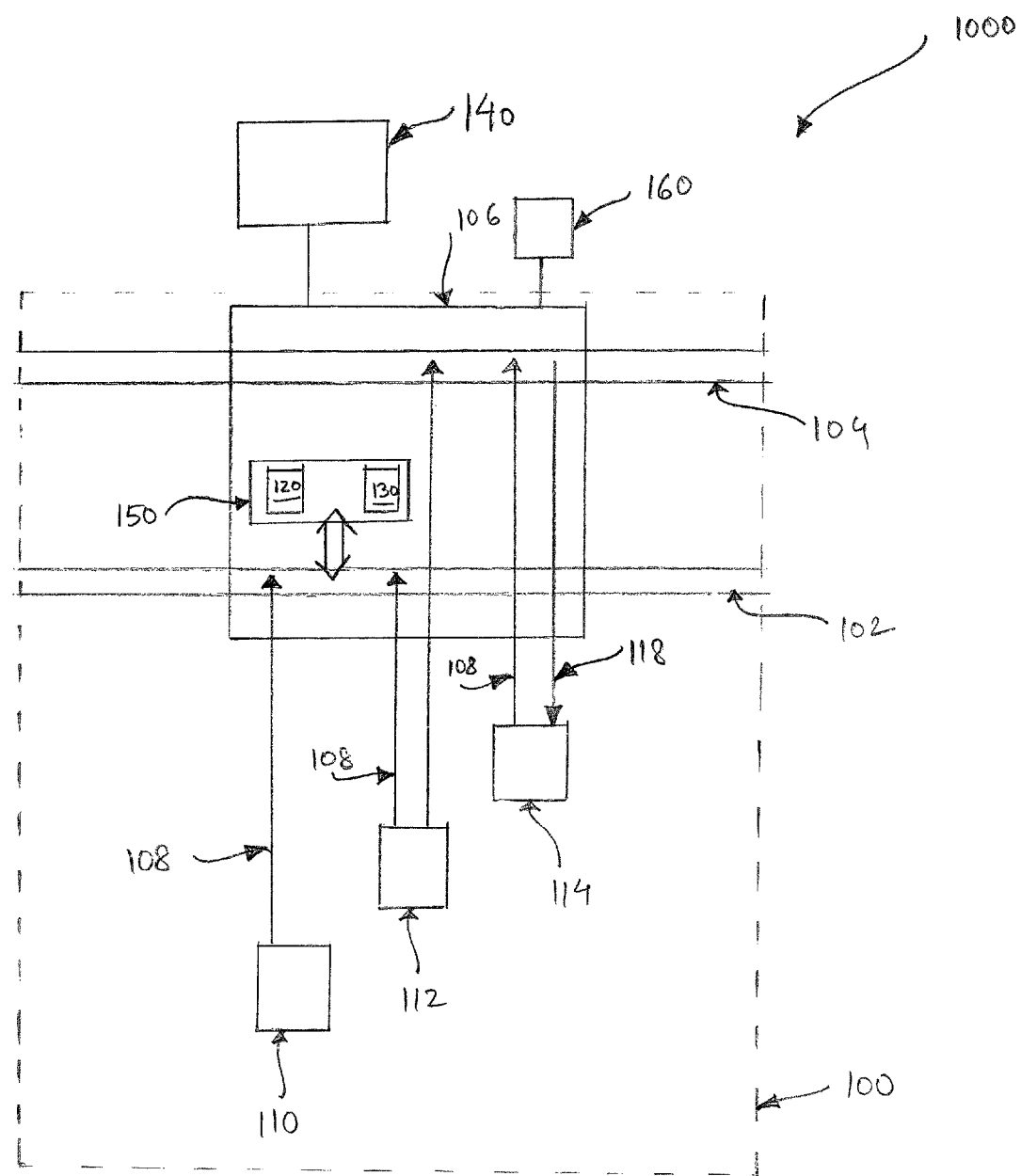
FIG. 1 schematically shows an example system in accordance with one of a number of embodiments.

An ordinary Wi-Fi network consists of several remote client devices, radio channels or bands and access points accessible through those radio bands. A first radio channel may be a 2.4 GHz radio band and a second radio channel may be a 5 GHz radio band. A dual band access point supports both radio bands and it appears as two separate independent entities to the client devices, for example, as a 2.4 GHz access point and as a 5 GHz access point. Dual band client devices can connect to either the access point that appears on the 5 GHz band or to the one that appears as the 2.4 GHz access point.

A typical Wi-Fi connection from a Wi-Fi Station (STA) or a client device involves a few steps for the establishment of the connection. The first step is called the access point discovery phase. Legacy Wi-Fi client devices or remote client devices discover the APs on a remote device by a standard Access Point (AP) discovery phase. During the discovery phase, the client device discovers an AP either by active scanning or by passive scanning. In active scanning the client device sends probe request frames to which the AP responds with probe response frames. In passive scanning the client device passively just listens to the beacon frames from the AP.

The second step comprises an open authentication step wherein, after the discovery phase, when the connection is being initiated by the end user, authentication has to be carried out. STA or the wireless client device sends an open authentication request management frame to the AP. On receiving the open authentication request management frame the AP responds with an open authentication response frame. Thereafter the step of association is carried out which involves sending of an association request by the STA and responding by the AP with a corresponding association response. The next step constitutes a security handshake. Based on security configuration of the AP an exchange takes place. For example, an AP with EAP Security involves EAP handshake followed by WPA/WPA2 four-way handshake. The next step constitutes a DHCP Protocol Exchange. After the security handshake, the STA acquires a valid IP address by carrying out standard DHCP protocol handshake.

During all the above mentioned steps of establishing a Wi-Fi connection, there is no way for an AP to determine if the remote station is a dual band capable remote station or a single band capable remote station. The band steering method according to an embodiment discloses determination of the dual band capability of the remote device first, and then overriding the AP selection algorithm on the dual band remote device if it has chosen to connect to an AP on the 2.4 GHz band and subsequently steer it to connect to an AP on the 5 GHz band.

As mentioned earlier, the legacy Wi-Fi client devices send probe request packets to the access points and the access points respond back with probe response packets. While this process, the client devices try to scan all available Wi-Fi channels by transmitting probe request packets on the channels trying to connect to an access point on the wireless network. A dual band supporting client device would scan all 2.4 GHz as well as 5 GHz radio bands or channels whereas a single band client would scan only 2.4 GHz channels. A single band access point supports only a single band, for example either a 2.4 GHz band or a 5 GHz band, whereas a dual band access point supports both the radio bands.

A 5 GHz access point gets discovered during the scan phase on responding to the probe request on its 5 GHz operating channel. Similarly a 2.4 GHz access point gets discovered on responding to the probe request on its 2.4 GHz operating channel.

FIG. 1 shows an example system 1000 in accordance with one of a number of embodiments. The system 1000 comprises a network 100 and a controller 140. The network 100 further comprises a dual band access point 106, radio bands 102, 104 available to the access node 106, and a plurality of client devices 110, 112, 114. The dual access point 106 has two operating channels corresponding to the two radio bands 102, 104 on which it can receive probe requests and open authentication request frames 118 from the client devices 110, 112, 114. The access point 106 is in an operable connection with the controller 140. The client devices 110, 112, 114 either have single band capability or dual band capability, i.e. the client devices can communicate with the access node and/or each other through one or both of the radio bands 102, 104.

The system 1000 may include one or more Wi-Fi radio bands 102, 104. In an exemplary embodiment the network 100 of the system 1000 includes two Wi-Fi radio bands, the first 102 radio band is a 2.4 GHz industrial, scientific and medical (ISM) radio band and the second 104 radio band is a 5 GHz ISM radio band. The client devices 110, 112, 114 discover the access points 106 on the radio bands by sending probe requests on both the bands 102, 104.

Each client device 110, 112, 114 may contain a transmitting unit (not shown in the figure) for transmitting an open authentication request frame 108 for seeking to establish a connection through a radio band 102, 104 to the access point 106 for communication purposes. In an embodiment the controller 114 controls the functioning of the access point 106.

According to an embodiment the dual band capable Station (STA) devices or wireless client devices 110, 112, 114 send open authentication requests 108 on both the bands 102, 104 to discover access points 106 (APs) on the bands 102, 104. The dual band capable remote devices 112, 114 discover the access points 106 on the bands 102, 104 by receiving an answer from the access point 106 on either of its two channels corresponding to the two radio bands 102, 104 in the form of an open authentication response frame 118.

According to an embodiment, the dual band capable remote device 112, 114 makes a selection of the access point 106 for connection using its own band preference algorithm. The dual band capable remote device 112, 114 initiates a connection with the chosen access point 106, i.e. access point 106 visible on the first band 102 or on the second band 104. If the chosen access point 106 is on the second radio band 104, i.e. the 5 GHz access point 106, then the access point 106 on the second radio band 104 immediately responds to the open authentication request 108 received from the client device 114 via its channel corresponding to the second radio band 104. However, if the chosen access point 106 is on the first radio band 102, i.e. the 2.4 GHz access point 106, then the choice is not appropriate and hence requires band-steering to be implemented as explained in respect of the following figures.

Typically a remote client device would try open authentication on the second radio band 104, for example the 5 GHz channel, of a dual band access point when its authentication is not responded on the first radio band 102, for example the 2.4 GHz channel of the access point 106, by sending an open authentication request 108 to the access point 106 on the second radio band 104 after sometime. But sometimes the dual band remote device 114 may take longer times to try connection on the 5 GHz band 104 which may add longer delays in connection there by hampering end user experience. In such situations the timer 160 plays an important role, as explained in the description corresponding to FIG. 2A, FIG. 2B and FIG. 2C.

The period of time is maintained by the timer 160. This arrangement makes sure that the first radio band 102 is not populated by dual band capable client devices 112, 114, attempting connection the first time itself, but at the same time it also ensures that if the dual band capable client device 112, 114 is unable to connect on the second radio band 104 of the access point 106, even after waiting for a first period of time $t_1$, it should be allowed to establish a connection with the access point 106 on the first radio band 102 subsequently in second period of time $t_2$ in order not to delay the establishment of a connection for an indeterminate amount of time. According to an embodiment, the periods of time $t_1$ and $t_2$ are set to a predetermined value based on optimization of results obtained from various tests conducted to determine the best case values of $t_1$ and $t_2$.

According to one of a number of embodiments, a Wi-Fi chip or driver implements a feature of a MAC filter logic. The MAC filter logic is implemented by a module 150 that maintains the blacklist 120 and the whitelist 130 on an access point 106. The whitelist 130 is a list of MAC addresses of remote devices 110 which are allowed or authorized to connect to the access point 106 on the corresponding radio band 102 to which the whitelist 130 is associated with, for example, the first band 102 as shown in FIG. 1. The blacklist 120 is a list of MAC addresses of remote devices 112, 114 which are not-allowed or are unauthorized to connect to the access point 106 on the corresponding radio band 102 to which the blacklist 130 is associated with, for example, the first band 102 as shown in FIG. 1.

It is known in the art to have a dual band access point 106 implement a MAC filter module common to both radio bands 102, 104. If a remote device's MAC address is in the whitelist 130 then it is allowed to connect on either of the bands 102, 104 or channels of the access point 106. If a remote device MAC address is in the blacklist 120 then it is not allowed to connect on either of the bands 102, 104. When the MAC address of a remote station device is put under the blacklist, the access point would ignore its open authentication requests, or probe requests 108, by not responding with an authentication response, i.e. probe response 118, thereby not authorizing the remote device to connect.

However, according to an embodiment as shown in FIG. 1, the chipset or the driver of the access point 106 implements a MAC filter logic specific for the first radio band 102. By implementing a specific MAC filter logic for the first radio band 102 or a separate MAC filter logic (not shown) for each of the bands 102, 104 instead of a common MAC filter module for both the bands, each band 102, 104 is able to independently allow or deny certain remote devices 110, 112, 114 to connect based on the MAC addresses stored in the whitelist 130 or the blacklist 120.

According to an embodiment when the dual band access point 106 receives an open authentication request, i.e. a probe request 108, from the remote device on a 2.4 GHz channel 102 it shall just add the remote device's MAC address into the blacklist 120 of the 2.4 GHz 102 access point's 106 MAC filter module. This would prevent the access point 106 on the first radio band 102 from responding to the authentication probe request 108 received from the client device. Later based on the decision to band-steer the connection or not the MAC address of the client device 110, 112, 114 can be allowed to remain in the MAC filter blacklist 120 or removed from it. Removal of a MAC address of a client device 110, 112, 114 from the blacklist 120 would entail generation of an open authentication response 118 by the access point 106. According to an exemplary embodiment, the MAC address of a client device 110, 112, 114 is removed from the blacklist 120 associated with the 2.4 GHz channel of the access node 106 after a first period of time $t_1$ elapses.

According to FIG. 2A, FIG. 2B and FIG. 2C, the access point 206 waits until a first predetermined period of time $t_1$, as measured by a timer 260, elapses to check again if an open authentication request 208b has come on the second radio band 204 during the time period $t_1$. FIG. 2A depicts a situation where there is no open authentication request received at the second radio band 204 even after a first period of time $t_1$ has elapsed and an open authentication request 208 is received on the first radio band 202. The access point 206 then generates an open authentication response 218a for the client device 210 to connect on the first radio band 202 after the first period of time $t_1$ has elapsed.

FIG. 2B shows an exemplary case where an open authentication request 208a comes on the first radio band 202. The access point 206 then waits and checks to see if an open authentication request 208b comes subsequently on the second radio band 204 within the first period of time $t_1$. As seen in FIG. 2B, an open authentication request 208b does come on the second radio band 204 within the first period of time $t_1$. In this case an open authentication response 218a will be generated immediately by the access point 206 on the second radio band 204 so that the client device 212, 214 can connect to the network via the access point 206 on the second radio band 204. And in this case no open authentication response will be generated by the access point 206 on its first radio band 202.

FIG. 2C depicts the scenario where due to some reason the access point 206 does not respond with an open authentication response on the second radio band 204 despite receiving an open authentication request 208b on its second radio band 204 from the client device 212, 214. In such a situation the predetermined second period of time $t_2$ helps in putting a limit to the waiting period until which the client device 212, 214 is denied access to the access point 206 on the first radio band 202. Therefore, after a second period of time $t_2$ has elapsed, the access point 206 generates a delayed open authentication response 218a on its first radio band 202 allowing the client device 212, 214 to establish a connection through the first radio band 202.

Figure 3A:
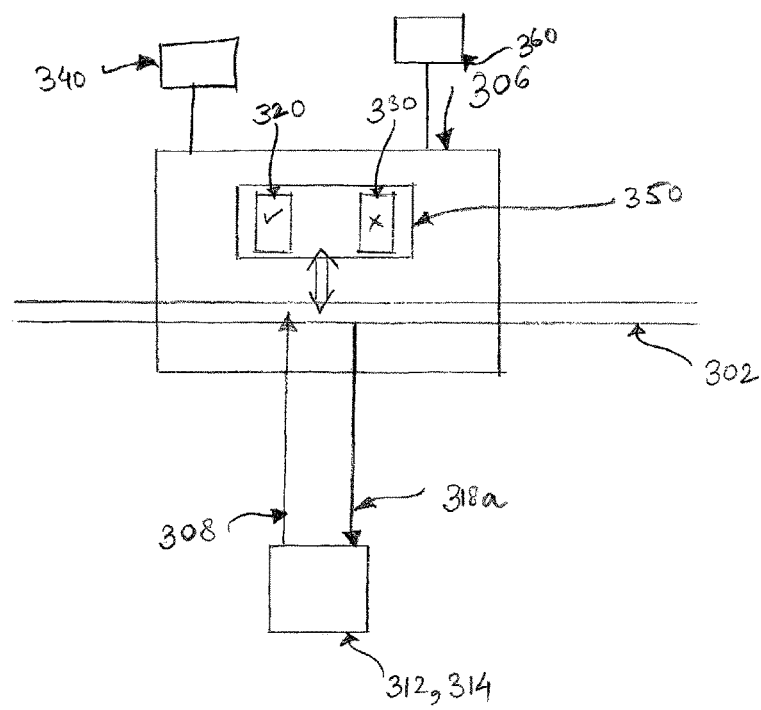
FIG. 3A and FIG. 3B schematically show other example systems in accordance with one of a number of embodiments.
Figure 3B:
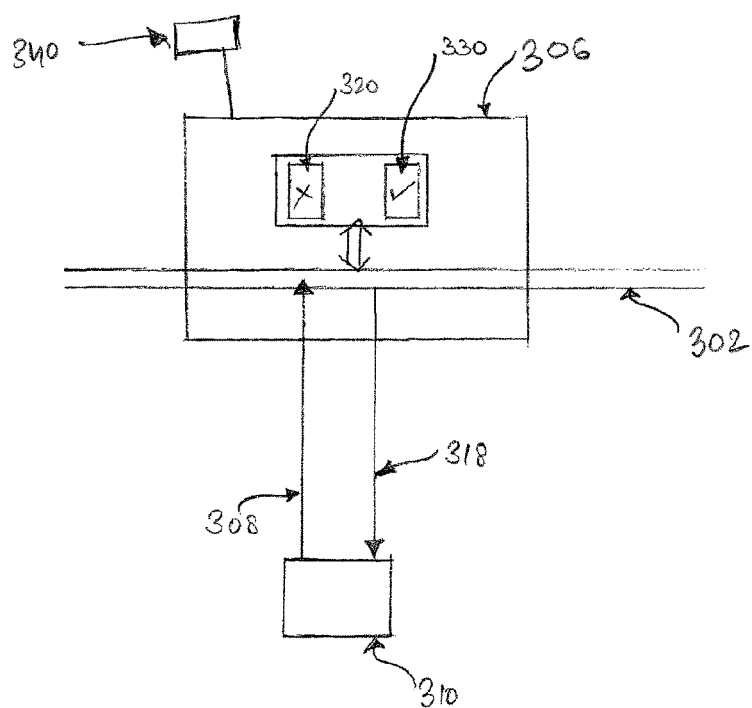

Now referring to FIG. 3A and FIG. 3B which shows the implementation of the MAC filter logic through a blacklist 320 and a whitelist 330 according to an embodiment. In an exemplary embodiment, if the dual band access point 306 receives probe requests from the remote stations or the client devices 312, 314 on both the bands 302, 304 indicated by the same source MAC address then it means that the remote device 312, 314 is a dual band station (STA), in other words, the remote device 312, 314 possesses dual band capability. According to an embodiment the dual band access point 306 keeps a tab of this capability by maintaining a list of such dual band capable remote devices 312, 314.

Referring to FIG. 3A, according to an embodiment, the dual band access point 306 assigns a blacklist 320 for its channel corresponding to the first radio band 302. The blacklist 320 comprising a list of MAC addresses of the dual band capable remote devices 312, 314. The role that the blacklist 320 plays is that when the access point 306 receives an open authentication request 308 on the first radio band 302 of the access point 306 from a dual band capable client device 312, 314, whose MAC address is found to be listed on the blacklist 320, the access point 306 does not generate an open authentication response to respond to the received open authentication request 308. The blacklist 320 constitutes MAC addresses of those devices which are not to be given access to on the access point 306. The blacklist 320 can be constituted separately for each of the two channels of the access point 306 corresponding to the two radio bands.

According to an embodiment a device MAC address can be removed from the blacklist 320 when the corresponding client device is to be given access to connect to the access point 306 after being denied connection for a considerable amount of time. According to an exemplary embodiment when the MAC address of a dual band client device 312, 314 is found to be enlisted in the blacklist 320, the controller 340 can remove the MAC address from the blacklist 320. This helps the client device 312, 314 to establish a connection with the access point 306 after receiving a delayed open authentication response 318a on the 2.4 GHz channel 302 after being denied a connection the first time when the client device 312, 314 was enlisted in the blacklist 320.

Now referring to FIG. 3B, according to yet another embodiment, the dual band capable access point 306 maintains a whitelist 330 comprising a list of MAC addresses of client devices 310 which are single band capable. When the access point 306 receives an open authentication request 308 on the first radio band 302 of the access point 306 from a single band capable client device 312, 314, whose MAC address is found to be listed on the whitelist 330, the access point 306 immediately generates the open authentication response 318 to respond to the received open authentication request 308. The whitelist 330 constitutes MAC addresses of those devices 310 which are allowed to access the access point 306. The whitelist 330 can be constituted separately for each of the two channels of the access point 306 corresponding to the two radio bands to allow access to a specific channel of the access point 106 as desired.

According to an embodiment the blacklist 320 and the whitelist 330 are saved in a memory unit which is linked to the first channel of the access point 306 corresponding to the first radio band 304. This means that the access point 306 visible to the client devices on the first radio band 302, in other words the 2.4 GHz access point 306, would have a blacklist 320 as well as a whitelist 330 comprising a list of MAC addresses of client devices to which it will deny or allow access respectively. According to another embodiment the access point 306 on the second radio band 304 also maintains a corresponding blacklist and a whitelist (not shown in the figure).

According to an embodiment the blacklist 320 is not an exhaustive list of MAC addresses of dual band capable client devices 312, 314. There could be many reasons and corner cases due to which even the MAC address of a dual band capable remote device 312, 314 might get missed in this blacklist 320. So a device whose MAC address is missing in this blacklist 320 shall not necessarily be assumed to be single band capable device 310.

According to an exemplary embodiment, if the MAC address of the client device 310, 312, 314, trying to authenticate in the first radio band 102, is not in the blacklist 320 of the access point 306 then the timer 360 is started. There is a possibility that this client device 310, 312, 314 may or may not be a dual band capable client device. One way to find out is to wait and watch if the client device 310, 312, 314 tries to connect on the second channel 304 of the access point 306 by sending an open authentication request on the second channel 304. After retrying authentication in first band 302 for some time the remote device 312, 314, if dual band capable, would give up and then try connecting to the same network (with same SSID) on the second band 304 by sending open authentication request 308 on the second channel 204 of the access point 306. This way the dual band access point 306 is successful in steering the connection of the dual band station or client device 312, 314 to the second radio band 304 of the access point 306 from the first radio band 302 of the access point 306.

Figure 4:
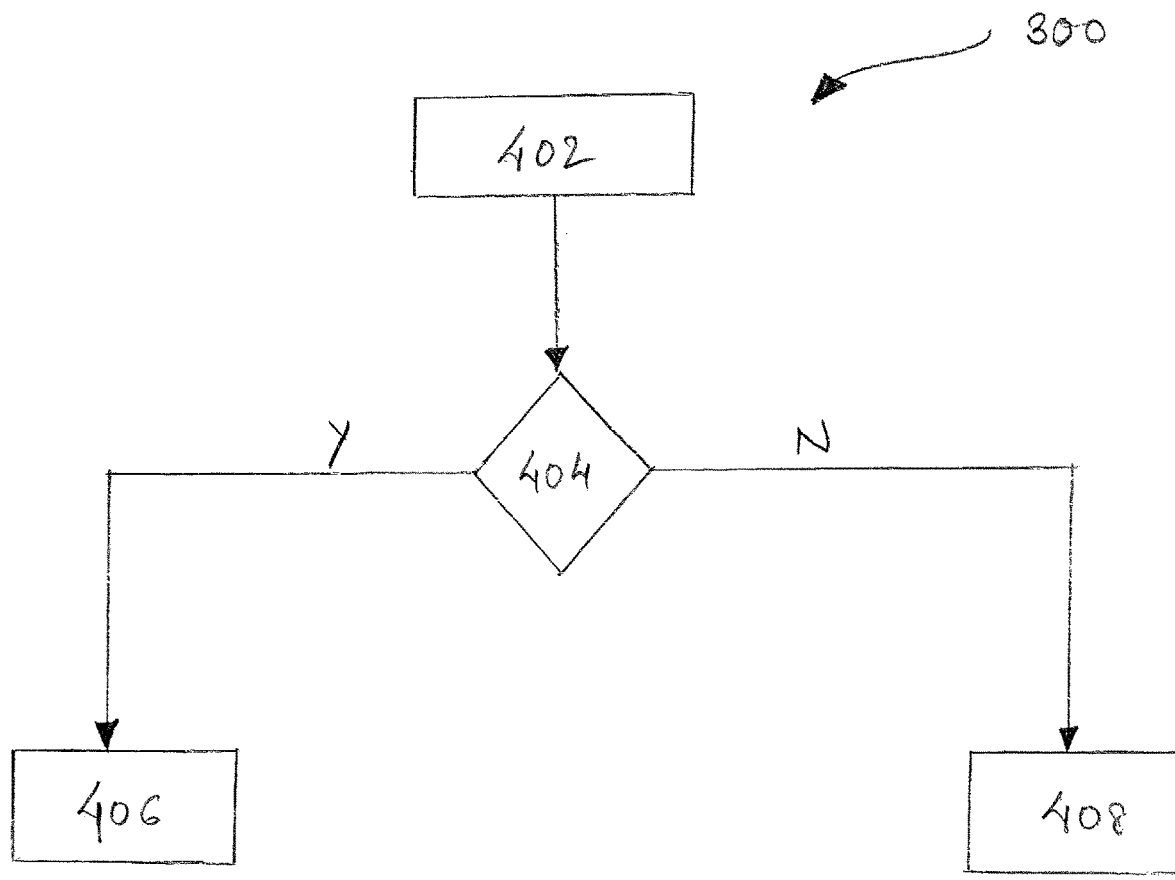
FIG. 4 is a flow chart for an example method in accordance with one of a number of embodiments.

Referring now to FIG. 4, it shows a flow chart of the method 300 disclosed according to an embodiment. The band steering method 300 for a wireless network comprises a first step 402 of receiving an open authentication request from the client device by the wireless access point on either or both the radio bands. The second step 404 comprises checking if the open authentication request is received at the second radio band or not. In case the open authentication request is received at the second radio band ("Y") then the step 406 of generating an open authentication response is carried out. However, if in the second step 404 it is found ("N") that the open authentication request is not received at the second radio band, but instead on the first radio band, then the step 408 of generating a delayed open authentication response is carried out.

The description of embodiments has been presented for purposes of illustration and description. Suitable modifications and variations to the embodiments may be performed in light of the above without departing from the scope of protection as determined by the claims.

In particular, whilst some of the above examples are described in connection with legacy Wi-Fi networks, the embodiments disclosed herein may also be implemented in other wireless networks that require client devices to be channeled to a preferred band or network over another less preferred band or network.

The invention claimed is:

1. A band steering method for a wireless network comprising at least a first and second radio bands, at least one wireless access point, and at least one client device, the method comprising the steps of:
   receiving, by the wireless access point, a first open authentication request from the client device on one or more of the radio bands;
   if the first open authentication request is received on the second radio band, generating an authentication response on the second radio band; and
   if the first open authentication request is received only on the first radio band, a delaying open authentication response for a first time period;
   receiving, by the wireless access point, a second authentication request from the client device on the second radio band; and
   if the client device is unable to connect to the second radio band within a second time period after the second authentication request from the client device to join the second radio band, generating another authentication response to join the first radio band.

2. The method of claim 1, further comprising:
   generating the delayed open authentication response after expiry of the first time period $t_1$ if no open authentication request is received on the second radio band during the first time period $t_1$;
   generating the delayed open authentication response after expiry of the second time period $t_2$ if open authentication request is received on the second radio band during the first time period $t_1$;
   wherein $t_1 < t_2$.

3. The method of claim 1, further comprising implementing an independent MAC filter logic for each of the bands on the wireless access point for allowing or restricting the generation of open authentication responses for the client device based on a MAC address of the client device.

4. The method of claim 3, further comprising determining that the client device is a dual band capable client device, and adding the MAC address of the client device to a blacklist of the access point for the first radio band.

5. The method of claim 4, wherein the client device is determined to be the dual band capable client device when the MAC address of the client device sending a probe response on the first radio band of the access point is the same as the MAC address of the client device sending a probe response on the second radio band of the access point.

6. The method of claim 1, wherein the first radio band is a 2.4 GHz industrial, scientific and medical (ISM) radio band and the second radio band is a 5 GHz ISM radio band.

7. The method of claim 1, wherein the wireless access point is a dual band Legacy Access Point.

8. The method of claim 1, wherein the wireless access point is located on an Infotainment Head Unit system.

9. The method of claim 1, wherein the radio bands support Wi-Fi Access Point roles or Wi-Fi Legacy roles.

10. The method of claim 2, further comprising maintaining, with the wireless access point, an internal timer for tracking the first and second periods of time, $t_1$ and $t_2$ respectively.

11. The method of claim 1, wherein the wireless access point is implemented in Wi-Fi chipset firmware.

12. The method of claim 1, wherein the wireless access point is implemented in a Wi-Fi driver.

13. A system comprising:
   at least one controller; and
   a network, the network comprising:
      at least a first and second radio bands;
      at least one wireless access point controlled by the controller; and
      at least one client device;
   wherein the wireless access point is arranged to:
      receive a first open authentication request from the client device on one or more of the radio bands;
      generate an open authentication response to join the second radio band if the first request is received on the second radio band;

delay the open authentication response if the first authentication request is received only on the first radio band for a first time period;

receive a second open authentication request from the client device on the second radio band; and if the client device is unable to connect to the second radio band within a second time period after the second open authentication request from the client device to join the second radio band, generate another open authentication response to join the first radio band.

14. The system of claim 13, further comprising a memory unit, wherein the controller is configured to save, in the memory unit, a determination of whether the at least one client device comprises a single band capable client device or a dual band capable client device.

15. A computer-program product having a non-transitory computer readable medium storing computer executable code which, when executed by a computer, causes the computer to:

receive, by a wireless access point, a first open authentication request from a client device on one or more radio bands including a first radio band and a second radio band;

if the first open authentication request is received on the second radio band, generate an open authentication response to join the second radio band;

if the first open authentication request is received only on the first radio band, delay the open authentication response for a first time period;

receive, by the wireless access point, a second authentication request from the client device on the second radio band; and if the client device is unable to connect to the second radio band within a second time period after the second authentication request from the client device to join the second radio band, generate another open authentication response to join the first radio band.

16. The method of claim 4, further comprising adding the MAC address of the client device to the blacklist if the MAC address of the client devices is not already on the blacklist.

* * * * *